United States Patent
Jo et al.

(10) Patent No.: US 10,344,404 B2
(45) Date of Patent: Jul. 9, 2019

(54) NANOCARBON COMPOSITE CARBON FIBER WITH LOW COST AND HIGH PERFORMANCE AND THEIR PREPARATION METHOD

(71) Applicant: KOREA INSTITUTE OF SCIENCE AND TECHNOLOGY, Seoul (KR)

(72) Inventors: Seong-Mu Jo, Wanju-gun (KR); Sung-Ho Lee, Wanju-gun (KR); Han-Ik Joh, Wanju-gun (KR); Se-Joon Park, Wanju-gun (KR); Hyeon-uk Yeo, Wanju-gun (KR); Bon-Cheol Ku, Wanju-gun (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 453 days.

(21) Appl. No.: 15/162,052

(22) Filed: May 23, 2016

(65) Prior Publication Data
US 2016/0348283 A1  Dec. 1, 2016

(30) Foreign Application Priority Data
May 26, 2015 (KR) .................. 10-2015-0073059

(51) Int. Cl.
*D01F 1/10* (2006.01)
*D01F 9/22* (2006.01)
(Continued)

(52) U.S. Cl.
CPC .............. *D01F 9/225* (2013.01); *D01F 1/10* (2013.01); *D01F 11/16* (2013.01); *C04B 35/83* (2013.01)

(58) Field of Classification Search
CPC . D01F 9/225; D01F 1/10; D01F 11/16; C04B 35/83
See application file for complete search history.

(56) References Cited

U.S. PATENT DOCUMENTS

2009/0286079 A1* 11/2009 Barker .................. B82Y 30/00
428/367

FOREIGN PATENT DOCUMENTS

CN 101250770 A 8/2008
CN 101619509 A 1/2010
(Continued)

OTHER PUBLICATIONS

Chae et al., Stabilization and carbonization of gel spun polyacrylonitrile/single wall carbon nanotube composite fibers, Polymer, May 6, 2007, pp. 3781-3789, vol. 48, Elsevier.
(Continued)

*Primary Examiner* — Daniel C. McCracken
(74) *Attorney, Agent, or Firm* — Goldilocks Zone IP Law

(57) ABSTRACT

The present disclosure relates to a preparation method for lowering a production cost of a high performance carbon fiber using a nanocarbon composite carbon fiber precursor fiber crosslinked by electron beam. More particularly, the present disclosure relates to a preparation method of a nanocarbon composite carbon fiber, including a nanocarbon containing step for containing nanocarbon in a structure of a carbon fiber precursor fiber, a nanocarbon composite carbon fiber precursor fiber preparation step for forming a composite of the nanocarbon and the carbon fiber precursor fiber by electron beam irradiation to enable crosslinking for improved heat resistance of the carbon fiber precursor fiber containing the nanocarbon, an oxidation•stabilization step for oxidizing•stabilizing the nanocarbon composite carbon fiber precursor fiber, and a carbonization step for carbonizing the oxidized•stabilized nanocarbon composite carbon fiber precursor fiber, and a nanocarbon composite carbon fiber prepared by the preparation method.

8 Claims, 1 Drawing Sheet

(51) Int. Cl.
    *C04B 35/83*    (2006.01)
    *D01F 11/16*    (2006.01)

(56)            References Cited

FOREIGN PATENT DOCUMENTS

CN      102534870 A     7/2012
CN      102586951 A     7/2012
JP      H9-143824 A     6/1997
JP      2003-105641 A   4/2003
JP      2011-162898 A   8/2011
RU      2534779 C1      12/2014
WO      2014-064373 A   5/2014

OTHER PUBLICATIONS

Sahin et al., High strength micron size carbon fibers from polyacrylonitrile—carbon nanotube precursors, Carbon, Jun. 5, 2014, pp. 442-453, vol. 77, Elsevier.
Miko et al., Effect of irradiation on aligned carbon nanotube fibers, AIP Conference Proceedings, 2004, pp. 107, vol. 723.

* cited by examiner

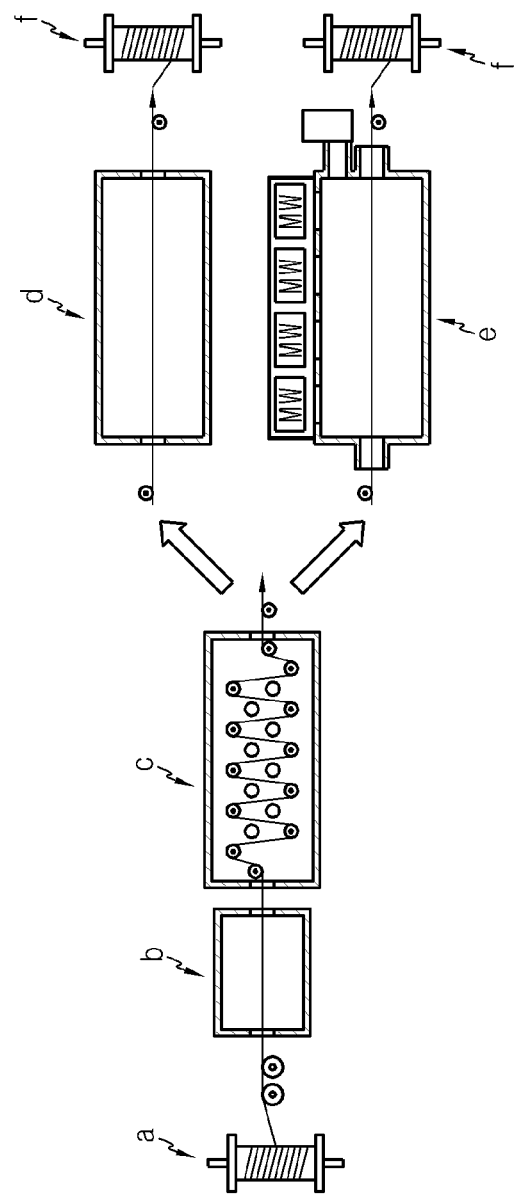

NANOCARBON COMPOSITE CARBON FIBER WITH LOW COST AND HIGH PERFORMANCE AND THEIR PREPARATION METHOD

CROSS-REFERENCE TO RELATED APPLICATION

The present application claims priority to Korean Patent Application No. 10-2015-0073059 filed in the Republic of Korea on May 26, 2015, the disclosure of which is incorporated herein by reference.

FIELD

The present disclosure relates to a preparation method for lowering a production cost of a high performance carbon fiber using a nanocarbon composite precursor fiber crosslinked by electron beam and a nanocarbon composite carbon fiber prepared by the method, and more particularly, to a preparation method of a nanocarbon composite carbon fiber including a nanocarbon containing step for containing nanocarbon in the structure of a precursor fiber; a nanocarbon composite precursor fiber preparation step for forming a composite of the nanocarbon and the precursor fiber by electron beam irradiation to enable crosslinking for improved heat resistance of the precursor fiber containing the nanocarbon; an oxidation•stabilization step for oxidizing•stabilizing the nanocarbon composite precursor fiber; and a carbonization step for carbonizing the oxidized•stabilized nanocarbon composite precursor fiber and a nanocarbon composite carbon fiber prepared by the preparation method.

According to the present disclosure, the crosslinking of the nanocarbon composite precursor fiber by electron beam irradiation induces chemical coupling between the nanocarbon and the carbon fiber precursor resin, improves the heat resistance with significant energy consumption reductions in the oxidation•stabilization step, and further increases the effect of the nanocarbon on the enhancement of the carbon fiber properties, contributing to the preparation of the carbon fiber with outstanding mechanical properties.

BACKGROUND

Carbon fiber is ⅕ lighter, but at least 10 times stronger than steel. Thus, carbon fibers are being used for high strength structural materials in a variety of industrial fields such as including aerospace, sports, automobiles, and bridges. With the rapid development and high tech of the automotive and aerospace industry, carbon fibers are receiving much attention as a next-generation material, and especially in the automotive industry, with the movement towards environment friendly, low energy consuming future automobiles, carbon fibers are in increasing demand. Also, with the growing demand for lighter automobiles as well as environmental regulations relating to automobile exhaust gas at future issue in the automotive industry, carbon fiber-reinforced composites that can reduce the weight of automobiles while maintaining the structural and mechanical strength are in increasingly high demand.

However, carbon fibers are now too expensive to be used for the above purposes. For a wide range of applications in the automotive industry and in the field of construction and infrastructures, carbon fibers need to have mechanical properties suitable for use in each industry at reduced costs that are as low as at least ⅓ of the present level.

Generally, carbon fibers are prepared through an oxidation•stabilization process for performing oxidation and stabilization by applying heat in the oxidizing atmosphere to make precursor fibers unfusible, and a carbonization process for carbonizing the oxidized•stabilized fibers at high temperature. Subsequently, a graphitization process may be performed. In this instance, the precursor fibers of the carbon fibers include polyacrylonitrile (PAN), pitch, rayon, lignin and polyethylene. Among them, the polyacrylonitrile (PAN) fibers are an optimum precursor for preparing high performance carbon fibers as compared to the other precursors because of having a high carbon yield of 50% or more and a high melting point. Accordingly, most of carbon fibers are currently prepared from polyacrylonitrile fibers.

The polyacrylonitrile fibers for carbon fiber precursors are made from a copolymer containing about 95 wt % of acrylic monomers (acrylonitrile; AN) and about 5 wt % or less of acrylic comonomers with a carboxyl functional group such as itaconic acid that serves as a catalyst in the stabilization reaction. The polyacrylonitrile fibers allow for preparation of carbon fibers having high performance.

However, the cost of polyacrylonitrile fibers for carbon fiber precursors is much higher than general fibers. Generally, a precursor fiber is given the weight of 43%, an oxidation•stabilization process is given the weight of 18%, a carbonization process is given the weight of 13%, and a graphitization process is given the weight of 15% in the cost of a carbon fiber. Accordingly, not only precursor fiber cost reduction but also an oxidation•stabilization process may be a key technology in the carbon fiber cost reduction technology. An oxidation•stabilization process is a very slow reaction compared to a carbonization process, and consumes a largest amount of energy in the carbon fiber preparation process.

The oxidation•stabilization process is a process which reacts fibers with oxygen to cause a dehydrogenation reaction and a cyclization reaction so that the molecular structure of the fibers is made more stable, and the oxidation•stabilization process using heat occupies most of the total process time in the carbon fiber preparation process, and thus, a variety of attempts have been made to reduce the stabilization process time.

Instead of the thermal stabilization process, a plasma generated using RF, DC, microwave or pulsed power may be used, allowing oxygen molecules reacting with fibers to be converted to highly reactive oxygen species (oxygen atom, ozone, NxOy, etc.), and through this, many studies have been made to increase the reaction speed of oxygen reacting with fibers to achieve a fast reaction.

However, when fibers have many bundles, it is difficult that heat or oxygen species penetrate deep in the bundles enough to cause a reaction in a general thermal stabilization process or an oxidation•stabilization process using plasma, and inner fiber strands are not fully stabilized as opposed to outer fiber strands, and in this case, carbon fibers formed after a carbonization process have notably low strength, resulting in overall quality degradation.

Recently, much attention is paid to polymer modification such as polymer crosslinking using electron beam and reactive group introduction, and electron beam irradiation causes a variety of polymer structure changes such as polymer crosslinking, breaking in polymer chains, reactive group introduction, and crystallinity change. When electron beam irradiation is applied to polyacrylonitrile fibers, a crosslinked bond is formed between polymer chains by carbon radicals generated at the polymer chains, and some is applied to nitrile groups at the side chain to generate imine groups. Thus, it is more efficient and environment friendly than a thermal process or a radiation process such as gamma rays and ultraviolet rays. When electron beam irradiation is applied to polyacrylonitrile fibers, the electron beam penetrates to a few centimeters depth and causes crosslinking, and its advantage is that even large-tow fibers are uniformly crosslinked. For this reason, attempts were made to use an electron beam for oxidation•stabilization of polyacrylonitrile fibers, but it is known that an electron beam only achieves crosslinking and does not cause a cyclization reaction by nitrile groups of polyacrylonitrile fibers.

Generally, defects and structural morphology of fibers are factors that restrict the tensile strength of carbon fibers, and to overcome the problem, a variety of stabilization and carbonization methods have been proposed, and one of them, gamma ray radiation is known to increase the strength of carbon fibers. The tensile strength and the modulus of elasticity of carbon nanotubes is 23~63 GPa and 640~1060 GPa, respectively, while the highest level of tensile strength and modulus of elasticity in existing carbon fibers is in the range of 6~7 GPa and 300~320 GPa. When considering that the theoretical carbon fiber tensile strength is 100~150 GPa, increasing the tensile strength of carbon fibers is a challenge. Thus, there are attempts to prepare carbon fibers by incorporating carbon nanotubes (CNTs) having excellent tensile strength and elasticity into composite structure. As carbon fiber precursors, nanocarbon composite PAN fibers were prepared by various methods such as including wet spinning and dry jet wet spinning. To enhance the mechanical properties of a polymer including polyacrylonitrile, improve electrical conductivity, or give functionality like electrostatic fibers, fibers based on composites of nanocarbons such as carbon nanotubes (Reference: RU 2534779 C1, CN 101619509 A, CN 101250770 A; Polymer, 48, (2007) 3781, Carbon, 77 (2014) 442] and graphene [Reference: CN 102586951A, CN 102534870 A] were prepared and attempts have been made to carbonize the nanocarbon composite polyacrylonitrile fibers to prepare carbon fibers with superior properties.

The introduction of carbon nanotubes (CNTs) and graphene to polymer fibers allows for the preparation of polymer grafted nanocarbon by synthesis of polyacrylonitrile polymer in the presence of CNT, or carbon fibers having improved properties by stabilization and carbonization of nanocarbon composite polyacrylonitrile fibers prepared by spinning a solution prepared by dissolving polyacrylonitrile in a nanocarbon dispersion. However, the tensile strength of carbon nanotube composite carbon fibers has a considerable level of improvement in the properties such as the tensile strength on the general purpose carbon fiber level with the addition of carbon nanotubes, while the effect on high performance carbon fibers is not yet known. In the preparation process of the strength nanocarbon composite polyacrylonitrile precursor fibers with high strength, a high ratio stretching process has a high risk of creating a defect structure such as the release at the interface between polyacrylonitrile and CNT in the composite polyacrylonitrile fibers. Thus, attempts were made to solve the problem by imparting chemical coupling using polyacrylonitrile polymer-grafted CNT, but the interface problem between CNT and polyacrylonitrile is still a challenge for improving the mechanical properties of carbon fibers.

On the other hand, electron beam irradiation enables polymer crosslinking or breaks polymer chains, and is used for modification of polymers and composites, but when applied to nanocarbon such as carbon nanotube and graphene, electron beam irradiation generates a new covalent bond between carbon nanotubes and consequently increases the strength [Reference: AIP Conference Proceedings (2004), 723, 107], and when high energy beam irradiation is applied, carbon nano materials produce heat, and taking advantage of this, it is used for graphitization reaction. When electron beam irradiation is applied to a carbon nanotube sheet including carbon nanotube and a crosslinker, the strength of the carbon nanotube sheet may be improved. This is because the crosslinker added forms a crosslinking structure between carbon nanotubes and between carbon nanotube bundles by the application of the electron beam. That is, it is known that a carbon-carbon single bond is efficiently formed between carbon nanotubes and between carbon nanotube bundles by electron beam irradiation, ensuring high strength.

Attempts were made to oxidize•stabilize carbon nanotube containing carbon fiber precursor fibers by electron beam irradiation solely. That is, when oxidation•stabilization is to be performed by the heat from carbon nanotube by electron beam irradiation, electron beam irradiation usually induces only a crosslinking bond between polymer chains, so the heat from carbon nanotube alone is insufficient for completing a cyclization reaction of —CN groups. Also, when oxidation•stabilization is to be performed by electron beam irradiation under temperature atmosphere heated by excessive electron beam irradiation, a crosslinking reaction by electron beam irradiation is as short as a few minutes or less, resulting in a very insufficient cyclization reaction. If the electron beam irradiation time increases and a crosslinking bond between polymer chains excessively increases, rather the crosslinked structure impedes a cyclization reaction by —CN groups, failing to complete the cyclization reaction and consequently oxidation•stabilization reaction, resulting in property degradation of carbon fibers.

RELATED LITERATURES

Patent Literature (Patent Literature 1) RU 2534779 C1
(Patent Literature 2) CN 101619509 A
(Patent Literature 3) CN 101250770 A
(Patent Literature 4) CN 102586951 A
(Patent Literature 5) CN 102534870 A Non-Patent Literature (Non-Patent Literature 1) Polymer, 48, (2007) 3781.
(Non-Patent Literature 2) Carbon, 77 (2014) 442.
(Non-Patent Literature 3) AIP Conference Proceedings (2004), 723, 107.

DISCLOSURE

Technical Problem

Therefore, the present disclosure is directed to providing a method for preparing a carbon fiber with high performance at a low cost by minimizing the energy consumption of an oxidation•stabilization process by using a nanocarbon composite fiber as a carbon fiber precursor and a high performance nanocarbon composite carbon fiber prepared by the preparation method.

Further, the present disclosure is directed to providing a method for preparing a high strength nanocarbon composite carbon fiber that can be prepared at a low cost by overcoming a drawback of an imperfect cyclization reaction of —CN groups occurring during stabilization reaction by electron beam irradiation alone according to the conventional art.

Further, the present disclosure is directed to providing a method for preparing a nanocarbon composite carbon fiber for solving the problems with a defect structure created by a stretching process at the interface between nanocarbon and precursor resin having carbon fiber forming capability, a defect structure created by a loss of a volatile component during an oxidation•stabilization process and a carbonization process, and mechanical property degradation caused by incomplete removal of the defect structure from a carbon fiber preparation process.

Technical Solution

To achieve the above objects, the present disclosure provides a nanocarbon composite carbon fiber with a nanocarbon composite structure in the carbon fiber, the nanocarbon composite carbon fiber prepared by performing an oxidation•stabilization step and a carbonization step on a precursor fiber containing nanocarbon, wherein the precursor fiber is crosslinked between the nanocarbon and a polymer by electron beam irradiation.

The precursor fiber of carbon fiber may be selected from the group consisting of polyacrylonitrile (PAN)-, pitch-, rayon-, lignin- and polyethylene-based fibers, and the carbon fiber precursor fiber may be polyacrylonitrile for textiles or an acrylic fiber including a carbon fiber precursor having 95 wt % or more of acrylonitrile (AN) monomers.

The nanocarbon may be selected from the group consisting of carbon nanotube (CNT), carbon nano fiber (CNF), graphite nano fiber (GNF), graphene, graphene oxide, and fullerene, and the nanocarbon may have a functional group including —COOH, —OH and —SO$_3$H or no functional group, or may be doped with a hetero atom including nitrogen or grafted with a polymer including polyacrylonitrile or a polyacrylonitrile copolymer.

A content of the nanocarbon in the nanocarbon composite precursor fiber of carbon fiber may be 0.05~60 wt % based on the weight of the precursor fiber.

A preparation method of a nanocarbon composite carbon fiber according to the present disclosure may include a nanocarbon containing step for containing nanocarbon in a structure of a precursor fiber, a nanocarbon composite precursor fiber preparation step for forming a composite of the nanocarbon and the precursor fiber by electron beam irradiation to enable crosslinking for improved heat resistance of the precursor fiber containing the nanocarbon, an oxidation•stabilization step for oxidizing•stabilizing the nanocarbon composite precursor fiber of carbon fiber, and a carbonization step for carbonizing the oxidized•stabilized nanocarbon composite precursor fiber of carbon fiber.

The nanocarbon containing step may include containing the nanocarbon in the structure of the precursor fiber by wet spinning, dry•wet spinning or melt spinning of the nanocarbon and a carbon fiber precursor, the precursor fiber of carbon fiber may be polyacrylonitrile for textiles or an acrylic fiber including a carbon fiber precursor having 95 wt % or more of acrylonitrile (AN) monomers, and the nanocarbon may be selected from the group consisting of carbon nanotube (CNT), carbon nano fiber (CNF), graphite nano fiber (GNF), graphene, graphene oxide, and fullerene.

The nanocarbon composite carbon fiber precursor fiber preparation step may be performed in air within a temperature range of from a room temperature to 300° C. by electron beam irradiation with energy of 50 kGy~5000 kGy.

The oxidation•stabilization step may include oxidizing•stabilizing the nanocarbon composite precursor fiber using thermal energy in air or using thermal coupling plasma under atmospheric pressure or vacuum, the oxidation•stabilization step using thermal coupling plasma may use a plasma in a temperature range of 180~350° C. under oxidizing atmosphere in the presence of oxygen, and the oxidation•stabilization step using thermal coupling plasma may be performed for 30 minutes~250 minutes.

The carbonization step may include carbonizing the oxidized•stabilized nanocarbon composite precursor fiber by thermal energy or microwave assisted plasma.

The preparation method of a nanocarbon composite carbon fiber according to the present disclosure may further include, after the carbonization step, a graphitization step by thermal energy or microwave assisted plasma at higher temperature than a carbonization temperature.

In preparing a carbon fiber from a nanocarbon composite precursor fiber, when electron beam irradiation is applied to the nanocarbon composite precursor fiber of carbon fiber, crosslinking occurs to increase not only the heat resistance but also the reactivity of nanocarbon by the electron beam energy, making it possible to prepare a nanocarbon composite carbon fiber precursor in which chemical coupling is formed at the interface between the nanocarbon and the precursor resin.

The present disclosure applies electron beam irradiation to a nanocarbon composite precursor fiber, and subsequently performs an oxidation•stabilization process by thermal energy or thermal coupling plasma, thereby overcoming the problem of the conventional art that performs oxidation•stabilization solely by electron beam irradiation or electron beam irradiation under the heated atmosphere.

In this instance, the carbon fiber precursor fiber used in the present disclosure is polyacrylonitrile-based resin or a fiber based on resin having carbon fiber forming capability such as pitch, and the polyacrylonitrile fiber may be polyacrylonitrile for textiles or a polyacrylonitrile fiber including a carbon fiber precursor having 95 wt % or more of acrylonitrile (AN) monomers.

In the present disclosure, the nanocarbon that makes up the nanocarbon composite carbon fiber precursor fiber may be 1- and 2-dimensional carbon-based nanocarbon including carbon nanotube (CNT) such as multi-walled carbon nanotube (MWCNT) including single-walled carbon nanotube (SWCNT) and double-walled carbon nanotube (DWCNT), carbon nanofiber (CNF), graphite nano fiber (GNF), graphene, graphene oxide, and fullerene.

Further, electron beam irradiation has the preferred energy radiated on the fiber in the range of 50~5000 kGy, the precursor fiber by electron beam irradiation increases in heat resistance by crosslinking of polymer chains, and the electron beam emitted to the nanocarbon increases the reactivity of the nanocarbon to generate chemical coupling between the nanocarbon and the precursor resin. The electron beam irradiation significantly reduces the heat generation temperature and an amount of heat generation of the nanocarbon composite carbon fiber precursor polymer, then completes the oxidation•stabilization reaction under lower temperature and a lower amount of heat generation than the subsequent oxidation•stabilization process by thermal energy, and can solve the heat generation problem caused by a large amount of heat generation that is difficult to control in an oxidation•stabilization step by a thermal process used in the conventional art. Further, chemical coupling generated between the nanocarbon and the carbon fiber precursor resin minimizes a defect structure at the interface therebetween and a defect structure occurring in the subsequent oxidation•stabilization process and carbonization process, producing the effect of good mechanical properties of nanocarbon on reinforcement of the mechanical properties of the prepared carbon fiber, as a result, carbon fibers having superior properties can be prepared at a low cost, and because electron beam penetrates into a sample at a large depth, even large-tow fibers such as 50K and 100K can be uniformly crosslinked.

On the other hand, an oxidation•stabilization reaction by plasma coupling thermal energy can reduce in oxidation•stabilization reaction time and temperature when compared to thermal energy alone, but when used singly, there is a problem because uniform oxidation•stabilization reaction of a fiber sample by plasma cannot be obtained. However, if nanocarbon composite carbon fiber precursor fiber crosslinked by electron beam irradiation is used, the subsequent oxidation•stabilization reaction can be uniformly completed and better properties can be obtained.

According to an aspect of the present disclosure, for the oxidation•stabilization reaction by plasma coupling thermal energy, after a plasma generator generates a plasma and supplies the plasma to the nanocarbon composite precursor fiber tow and a heat supplier supplies heat to the fiber, oxidation•stabilization is performed on the nanocarbon composite precursor fiber using heat and plasma at the same time.

The nanocarbon composite carbon fiber precursor fiber having undergone electron beam irradiation is oxidized•stabilized by thermal energy or thermal energy coupling plasma, and is carbonized by thermal energy in the same way as the conventional art, to prepare a carbon fiber. Alternatively, carbonization and graphitization may be further performed by microwave assisted plasma (MAP) instead of thermal energy.

ADVANTAGEOUS EFFECTS

According to the present disclosure, electron beam irradiation not only crosslinks the nanocarbon composite carbon fiber precursor fiber but also induces chemical coupling at the interface between the nanocarbon and the carbon fiber precursor polymer, thereby completing the oxidation•stabilization of the precursor having the increased heat resistance and maximized reinforcement effect of the nanocarbon at even lower temperature and much shorter time in the oxidation•stabilization reaction step by thermal energy or plasma coupling thermal energy, and advantages are significant reductions in energy consumption and preparation of a high strength carbon fiber at a low cost.

BRIEF DESCRIPTION OF THE DRAWING

FIG. 1 is a diagram illustrating a process for preparing a nanocarbon composite carbon fiber according to an embodiment of the present disclosure.

DETAILED DESCRIPTION

Hereinafter, the present disclosure is described in detail.

The present disclosure relates to a preparation method of a nanocarbon composite carbon fiber including a nanocarbon containing step for containing nanocarbon in the structure of a precursor fiber; a nanocarbon composite precursor fiber preparation step for forming a composite of the nanocarbon and the carbon fiber precursor fiber by electron beam irradiation to enable crosslinking for improved heat resistance of the precursor fiber containing the nanocarbon; an oxidation•stabilization step for oxidizing•stabilizing the nanocarbon composite precursor fiber using thermal energy in air or using thermal coupling plasma under atmospheric pressure or vacuum; a carbonization step for carbonizing the oxidized•stabilized nanocarbon composite precursor fiber by thermal energy or microwave assisted plasma; and a graphitization step by thermal energy or microwave assisted plasma at higher temperature than the carbonization temperature after the carbonization step, and a nanocarbon composite carbon fiber prepared by the preparation method.

FIG. 1 is a diagram illustrating a process for preparing a nanocarbon composite carbon fiber according to an embodiment of the present disclosure, and each step of a process for preparing a nanocarbon composite carbon fiber with high performance at a low cost according to the present disclosure is described as follows.

1) Nanocarbon Containing Step

In preparing a nanocarbon composite carbon fiber according to the present disclosure, the nanocarbon containing step for containing nanocarbon in the structure of a precursor fiber is a step for containing nanocarbon in a precursor fiber of carbon fiber.

The precursor fiber of carbon fiber is polyacrylonitrile-based resin or a fiber based on resin having carbon fiber forming capability such as pitch. The pitch includes coal derived pitches, petroleum derived pitches or bio-pitches produced from biomass including woods or lignin.

The polyacrylonitrile polymer for the polyacrylonitrile fiber used in the present disclosure includes polyacrylonitrile for textiles (for clothes or the like) having less than 95 wt % of acrylonitrile monomers and polyacrylonitrile for carbon fiber precursors having 95 wt % or more of acrylonitrile monomers.

Further, in the present disclosure, the nanocarbon that makes up the nanocarbon composite precursor fiber may be 1- and 2-dimensional carbon-based nanocarbon including carbon nanotube (CNT) such as multi-walled carbon nanotube (MWCNT) including single-walled carbon nanotube (SWCNT) and double-walled carbon nanotube (DWCNT), carbon nano fiber (CNF), graphite nano fiber (GNF), graphene, graphene oxide, and fullerene.

The nanocarbon may have no functional group or have an inorganic functional group such as —COOH, —OH, and —SO$_3$H attached to the surface or edge, or may be doped with a hetero element such as nitrogen or grafted with a polymer including polyacrylonitrile and a polyacrylonitrile copolymer.

The nanocarbon content in the nanocarbon composite precursor fiber of carbon fiber is 0.05~60 wt % based on the weight of the resin having carbon fiber forming capability. Where the nanocarbon is dispersed in the entire fiber very uniformly, the higher nanocarbon content is better. As the nanocarbon content is higher, a carbon fiber having superior mechanical properties is expected due to an increase of reactive group generation by electron beam irradiation and a chemical coupling increase of polymerization. However, dispersibility significantly reduces with the increasing nanocarbon content, and accordingly, the nanocarbon content is preferably 0.1~10 wt %, and more preferably 0.1~1 wt %.

In the present disclosure, the nanocarbon containing step for containing nanocarbon in the structure of a nanocarbon composite precursor fiber is described using polyacrylonitrile and carbon nanotube as follows.

In the present disclosure, after dispersing the carbon nanotube in N,N-dimethylformamide (DMF) or dimethylsulfoxide (DMSO), polyacrylonitrile powder was added at the room temperature or less, stirred, swollen, and heated at the temperature of about 80° C. to completely dissolve polyacrylonitrile, and the solution was filtered and degassed to prepare a spinning solution. The spinning solution was wet spun or dry jet wet spun using a 30% DMF or DMSO aqueous solution of room temperature as a coagulation bath, and then washed, followed by stretching through a 95° C. hot water bath and a 170° C. hot air stretching furnace and winding at the speed of about 30 m/min. The properties of the prepared composite polyacrylonitrile fiber containing nanocarbon are shown in Table 1, and it is found that the composite fiber has the improved mechanical properties when 0.5 wt % of MWCNT is added.

2) Nanocarbon Composite Carbon Fiber Precursor Fiber Preparation Step

The nanocarbon composite carbon fiber precursor fiber preparation step for forming a composite of the nanocarbon and the precursor fiber by electron beam irradiation to enable crosslinking for improved heat resistance of the precursor fiber containing nanocarbon is characterized in that crosslinking is accomplished by electron beam irradiation with energy of 50 kGy~5000 kGy applied to the precursor fiber containing nanocarbon, to prepare a nanocarbon composite precursor fiber with a composite structure.

The present disclosure applies electron beam irradiation to the nanocarbon composite precursor fiber of carbon fiber, and subsequently performs an oxidation•stabilization process by thermal energy or thermal coupling plasma, to overcome the problem of the conventional art which only performs oxidation•stabilization by electron beam irradiation or electron beam irradiation under heated atmosphere.

The electron beam irradiation is usually performed at the room temperature, and electron beam irradiation may be performed in heated air of from the room temperature to 300° C.

In the case of a polyacrylonitrile precursor fiber, electron beam irradiation usually forms a crosslinking bond by a C—C bond between carbon fiber precursor polymer chains, and hardly causes a cyclization reaction of —CN groups. Thus, if electron beam irradiation is performed in heated air of from the room temperature to 300° C., a cyclization reaction of —CN groups may be induced together. However, because this cyclization reaction is a very slow reaction, if the electron beam irradiation time increases to complete the cyclization reaction, electron beam irradiation is too much. That is, if a crosslinking bond by electron beam irradiation excessively increases, the polymer chain structure becomes inflexible, impeding a cyclization reaction by —CN group. Accordingly, the electron beam irradiation time is 30 minutes or less, and preferably 15 minutes or less.

In the present disclosure, the nanocarbon composite carbon fiber precursor fiber crosslinked properly by electron beam irradiation goes through a carbonization reaction after completing a cyclization reaction by —CN group in the subsequent oxidation•stabilization process to prepare a low cost and high performance carbon fiber.

In preparing a carbon fiber according to the present disclosure, the nanocarbon composite precursor used as a starting material is a polyacrylonitrile fiber for carbon fiber precursors having 95 wt % or more of acrylonitrile (AN) monomers. As shown in example 3, the fiber prepared by spinning a polyacrylonitrile solution for carbon fiber precursors having My of 137,600 and the polyacrylonitrile fiber for MWCNT composite carbon fiber precursors prepared by spinning a spinning solution containing 0.5 wt % of multi-walled carbon nanotubes (MWCNTs) based on the weight of the polymer were subjected to electron beam irradiation. The electron beam irradiation was each performed at the beam current of 1 mA using the accelerating voltage of 1.14 MeV with energy of 200 kGy~1500 kGy. In the electron beam irradiation of 500 kGy or more, as a result of measuring the gel content after dissolving in dimethylsulfoxide, the gel content was higher than or equal to 85%, and in FT-IR analysis, there was no change in the intensity of —CN groups even after the electron beam irradiation, showing that crosslinking between polymer chains was accomplished without a cyclization reaction of —CN groups by the electron beam irradiation.

In preparing a carbon fiber according to the present disclosure, the nanocarbon composite carbon fiber precursor used as a starting material is polyacrylonitrile for textiles (for clothes or the like) having less than 95 wt % of acrylonitrile monomers. Specifically, the polyacrylonitrile fiber for textiles is fibers that are generally not used to prepare a carbon fiber due to having low content of acrylonitrile monomers, containing no comonomer with a carboxylic acid group such as an itaconic acid monomer, and having a lower molecular weight and a lower degree of orientation of polymer chains than general fibers for carbon fiber precursors. The present disclosure may use a polyacrylonitrile polymer for general purpose textiles by itself without further modification. That is, the polyacrylonitrile fiber for textiles in Table 1 was prepared by forming a composite of a polyacrylonitrile polymer for textiles and nanocarbon.

By the electron beam irradiation, the nanocarbon composite polyacrylonitrile fiber did not undergo a cyclization reaction by —CN group, and was only subjected to crosslinking. Seeing a DSC curve of a sample subjected to electron beam irradiation, it reveals that the heat generation peak for polyacrylonitrile cyclization is significantly lowered by electron beam crosslinking. This shows that oxidation•stabilization reaction can be performed at much lower temperature.

Although the penetration depth of the electron beam into a material varies depending on the material, in the case of a fiber sample, the electron beam penetrates to the depth of a few centimeters to cause crosslinking. Accordingly, even large-tow of 100K is sufficiently crosslinked, a high heat generation reaction is inhibited in the subsequent oxidation•stabilization process and oxidation•stabilization is stably performed without a fire, and a carbon fiber is successively formed when carbonized. This shows that electron beam crosslinking reaction can make a great contribution to the preparation of a large-tow carbon fiber.

The polyacrylonitrile fiber for textiles generally contains an additive to increase dyeability at the step of polymer synthesis, and this compound acts as a factor which significantly degrades the properties of a carbon fiber. Accordingly, in order to use the polyacrylonitrile fiber for textiles as a precursor for a low cost carbon fiber, polymerization may be performed, without the addition of a compound for improving dyeability at the step of polymer polymerization, by slightly reducing the content of acrylic comonomers, increasing the content of acrylonitrile monomers and adding itaconic acid as a comonomer within the limits in which the polymerization cost does not rise. The modification of the polyacrylonitrile polymer for textiles brings about improvements in carbon fiber properties and carbonization yield when converting to a carbon fiber, contributing to low costs. In the present disclosure, the nanocarbon composite polyacrylonitrile fiber may be prepared using the modified polyacrylonitrile polymer for textiles such as above and may be used after electron beam irradiation.

3) Oxidation•Stabilization Step

In preparing a carbon fiber using the nanocarbon composite precursor fiber of carbon fiber, an oxidation•stabilization process is a very important process.

Especially, in the case of a polyacrylonitrile precursor, in order to prevent a fiber of a polymer material from melting at high temperature during carbonization or graphitization, it is necessary to change the molecule structure in the fiber to have flame resistance before carbonization reaction, and induce a bond between molecules to form a ladder structure. The oxidation•stabilization reaction is largely classified into a cyclization reaction and a dehydrogenation and oxidation reaction. The cyclization reaction generates cyclization by a radial reaction in the fiber molecule by the external energy, and the dehydrogenation reaction and oxidation reaction removes a hydrogen atom as a molecule in the oxidizing atmosphere or induces a bond between molecules by bonding in oxygen. In this instance, it is critical that a stable ladder structure is formed over the entire fiber to provide superior flame resistance when a reacting oxygen atom is evenly transmitted to the inside of the fiber.

The oxidation•stabilization process is a process for nonfusion to have flame resistance in carbonization or graphitization, and is preferably performed as follows.

According to the embodiment of the present disclosure, for the nanocarbon composite polyacrylonitrile fiber samples in Table 1, the oxidation•stabilization process is performed on the fiber samples crosslinked by electron beam irradiation of 1000 kGy in example 3 under air atmosphere through heat treatment in a temperature controllable electric furnace. The oxidation•stabilization by thermal energy is performed at 180~350° C. under tension in oxidizing gas or air, but because the oxidation•stabilization time significantly reduces to ⅓~¼ in the same temperature condition, compared to oxidation•stabilization by heat treatment of a precursor fiber without electron beam crosslinking, energy consumption significantly reduces.

Also, according to the preferred embodiment of the present disclosure, the oxidation•stabilization process is preferably performed on the nanocarbon composite polyacrylonitrile fiber crosslinked by electron beam using a plasma under thermal energy coupling atmospheric pressure or vacuum. That is, it is preferred to perform oxidation•stabilization by generating a plasma while mixing and injecting, for example, argon gas as plasma generating gas and oxygen gas as reactive gas into a reaction chamber. When oxidation•stabilization is performed using a plasma as described above, an active oxygen species having a high energy density and very high reactivity is generated. Accordingly, oxidation•stabilization of the fiber is uniform and occurs well in a short time, and better properties than a processing method by thermal energy are provided. Specifically, an oxygen species such as monoatomic oxygen or superoxide ($O_2-$), hydrogen peroxide ($H_2O_2$), hydroxyl radical (.OH) is generated at the time of plasma generation, causing a uniform and stable oxidation•stabilization reaction and reduced oxidation•stabilization reaction time.

The oxidation•stabilization reaction by plasma coupling thermal energy can significantly reduce the oxidation•stabilization reaction time and temperature when compared to thermal energy alone, but when used singly, there is a problem because uniform oxidation•stabilization reaction of a fiber sample cannot be obtained. However, according to the embodiment of the present disclosure, when the nanocarbon composite polyacrylonitrile fiber crosslinked by electron beam irradiation is used, the oxidation•stabilization reaction can be uniformly completed and better properties can be obtained.

However, the oxidation•stabilization step by plasma processing in the present disclosure is characterized in that oxidation and stabilization is performed using a plasma in the temperature range of 180~350° C. under the oxidizing atmosphere in the presence of oxygen, normally for 30 minutes~250 minutes.

As can be seen from example 6 of the present disclosure, in the case of a single-walled carbon nanotube composite polyacrylonitrile precursor fiber prepared using polyacrylonitrile having a larger molecular weight, it is found that a carbon fiber prepared by electron beam irradiation, thermal stabilization or thermal coupling plasma stabilization and carbonization has significant improvements in the properties. This shows that even in the case of a high performance carbon fiber, energy consumption can significantly reduce in the oxidation•stabilization process and the properties of the carbon fiber can be significantly improved when the nanocarbon composite polyacrylonitrile precursor fiber is used after electron beam crosslinking.

According to the present disclosure, the oxidation•stabilization reaction by plasma coupling thermal energy is characterized in that oxidation•stabilization is performed on the carbon fiber precursor fiber using heat and plasma at the same time, and the plasma is generated by a plasma generator and supplied to the carbon fiber precursor fiber tow, and the heat is supplied to the fiber by a heat supplier.

The plasma generator includes a power supplier to supply high frequency power; an electrode which is supplied with the high frequency power from the power supplier; and a ground electrode which is grounded or is supplied with separate high frequency power, and the plasma is generated between the electrode and the ground electrode. In this instance, the power supplier may be any one selected from the group consisting of DC, RF power and plus power. In this instance, power supplied to the plasma may be adjusted by the power supplied to the electrode or the ground electrode.

The heat source is supplied by a heater, the supply of thermal energy is adjusted by the power supplied to the heater, and a ratio of the power applied to the heater and the power applied to the plasma can be adjusted. Furthermore, the heat supplier may be an air feed port for supplying heated air to the nanocarbon composite carbon fiber precursor fiber. The heat source is supplied from the heated air supplied through the air feed port, the supply of thermal energy is adjusted by the flow rate and temperature of the heated air supplied through the air feed port, and stabilization can be controlled by adjusting the flow rate and temperature of the heated air and the ratio of power applied to the plasma. In this instance, the heated air may include oxygen or an oxygen compound.

4) Carbonization Step

Subsequently, after the electron beam crosslinking, to convert the nanocarbon composite precursor fiber oxidized•stabilized by plasma coupling thermal energy to a carbon fiber, a carbonization process is performed at high temperature by thermal energy. In this instance, the carbonization process is performed in inert atmosphere such as nitrogen through a carbonization furnace of high temperature. It is preferred to maintain the inert atmosphere such as nitrogen, and if other reactive gas is introduced, it acts as a big defect during carbonization due to an unnecessary chemical reaction, and thus, the atmosphere such as nitrogen is maintained. The carbonization reaction is preferably performed under nitrogen atmosphere at the temperature of, for example, 1,000~1,500° C.

In addition, the carbonization process may carry out carbonization reaction by microwave assisted plasma (MAP) instead of thermal energy. When the carbonization reaction is performed using microwave assisted plasma (MAP) as described above, a carbon fiber having properties of the same level as a method using thermal energy can be prepared, and particularly, there is an advantage in terms of a consumption reduction of energy in much larger amounts than using thermal energy.

On the other hand, the preparation method of a carbon fiber according to the present disclosure may further include a graphitization step for graphitizing the carbon fiber in addition to the process. In this instance, the graphitization step is performed after the carbonization step is performed. That is, the nanocarbon composite carbon fiber precursor fiber carbonized through the carbonization process is graphitized at higher temperature than the carbonization temperature. The graphitization step may be performed by thermal energy. For example, the fiber carbonized in a carbonization furnace may be graphitized by heat treatment in high temperature range of 2,000~3,000° C.

Also, in the graphitization step, to reduce energy consumption as in the carbonization reaction, the graphitization reaction may be induced by microwave assisted plasma.

According to the present disclosure described hereinabove, after electron beam crosslinking of the nanocarbon composite carbon fiber precursor fiber, when plasma coupling thermal energy is used in the oxidation•stabilization step, a carbon fiber having mass production and a low production cost, namely, a carbon fiber of a low cost having high performance can be easily prepared.

Although the embodiment of the present disclosure has been hereinabove described, those having ordinary skill in the technical field pertaining to the present disclosure will understand that the present disclosure may be embodied in other particular form without any change to the technical aspect or essential feature of the present disclosure. Therefore, the embodiment described hereinabove is provided for purposes of illustration in all aspects, and is not intended to limit the scope of the present disclosure.

General Method of Preparing Carbon Nanotube Composite Polyacrylonitrile Spinning Solution The carbon nanotube used in the present disclosure is single-walled carbon nanotube (SWCNT), double-walled carbon nanotube (DWCNT) and multi-walled carbon nanotube (MWCNT), and its diameter is about 0.5~100 nm, preferably 1~80 nm. The length is in the range of 0.1~200 μm, and preferably 1~200 μm. After dispersing it in N,N-dimethylformamide (DMF) or dimethylsulfoxide (DMSO), polyacrylonitrile powder was added at the room temperature or less, then stirred, swollen and heated at the temperature of about 80° C. to completely dissolve the PAN, and the solution was filtered and degassed to prepare a spinning solution. The spinning solution was wet spun or dry jet wet spun using a 30% DMF or DMSO aqueous solution of room temperature as a coagulation bath, and then washed, followed by stretching through a 95° C. hot water bath and a 170° C. hot air stretching furnace and winding at the speed of about 30 m/min.

The mechanical properties of the fiber were measured using a universal testing machine (UTM) widely used to measure the mechanical properties, for single fibers ASTM D3822 standard.

EXAMPLE 1

A polyacrylonitrile fiber (supplied by Taekwang Industrial Co., Ltd. in Republic of Korea) widely used for general textiles (for clothes) was used, and generally, a polyacrylonitrile fiber for textiles contains less than 95 wt % of acrylonitrile (AN) monomers. The polyacrylonitrile fiber for textiles was re-dissolved in dimethylformamide (DMF) to prepare a spinning solution which was then wet spun to prepare a polyacrylonitrile fiber for textiles (hereinafter referred to as 'PAN fiber for textiles'), and its properties are shown in Table 1.

Furthermore, a spinning solution prepared by dissolving the PAN for textiles in a DMF solution containing 0.5 wt % of multi-walled carbon nanotubes (MWCNTs, available from Nanocyl) dispersed well based on the weight of the PAN for textiles was wet spun in the same condition to prepare a PAN fiber for MWCNT composite textiles, and its properties are shown in Table 1.

EXAMPLE 2

A fiber widely used as a precursor for preparing a carbon fiber (generally containing 95 wt % or more of acrylonitrile monomers) was re-dissolved in DMF and wet spun to prepare a PAN fiber for carbon fiber precursors, and its properties are shown in Table 1.

Furthermore, a spinning solution prepared by re-dissolving the polyacrylonitrile precursor fibers for carbon fiber in a DMF solution containing 0.5 wt % of multi-walled carbon nanotubes (MWCNTs, available from Nanocyl) dispersed based on the weight of the polyacrylonitrile for carbon fiber precursors was wet spun in the same condition to prepare a PAN fiber for MWCNT composite carbon fiber precursors, and its properties are shown in Table 1.

As shown in Table 1, the multi-walled carbon nanotube composite PAN fiber has better properties than the fiber containing no carbon nanotube.

TABLE 1

| Precursor fiber | Note | Fiber diameter (μm) | Tensile strength | Elasticity | Elongation |
|---|---|---|---|---|---|
| PAN fiber 1 | PAN fiber for textile (Mv 96,700) | 10 | 5.9 | 110 | 12.0 |
| PAN fiber 2 | MWCNT composite PAN fiber using PAN fiber for textile | 10.2 | 6.6 | 143 | 11.0 |
| PAN fiber 3 | PAN fiber for carbon fiber precursor (Mv 137,600) | 11 | 6.5 | 152 | 10.6 |
| PAN fiber 4 | MWCNT composite PAN fiber using PAN fiber for carbon fiber precursor | 10.8 | 8.4 | 183 | 10.2 |

EXAMPLE 3

Crosslinking by Electron Beam Irradiation

The PAN fiber samples were subjected to electron beam irradiation. The electron beam was each radiated at the beam current of 1 mA using the accelerating voltage of 1.14 MeV with energy of 200 kGy~1500 kGy. The radiated energy is calculated by the following equation.

Current (mA)×Radiation time (sec)=Total energy (kGy)

The samples subjected to electron beam irradiation of 500 kGy or more were dissolved in dimethylsulfoxide, and as a result of measuring the gel content, the gel content was higher than or equal to 85%, and in FT-IR analysis, there was no change in the intensity of —CN groups even after the electron beam irradiation, showing that a cyclization reaction of —CN groups hardly occurred and crosslinking between polymer chains was primarily performed by the electron beam irradiation.

EXAMPLE 4-1

Oxidation•Stabilization Reaction Under Oxidizing Atmosphere Solely Using Thermal Energy For the PAN fiber sample in Table 1 and the fiber samples crosslinked by electron beam irradiation of 1000 kGy in example 3, an oxidation•stabilization process was performed under air atmosphere through heat treatment in a temperature controllable electric furnace. In this instance, the oxidation•stabilization process is a process for infusiblization whereby the fiber can withstand at high temperature during carbonization or graphitization, so oxidizing atmosphere and reaction condition allowing accurate temperature control and oxidation is important. To this end, good circulation of hot air was accomplished, allowing for smooth supply of oxygen in outside air, and reaction conditions for oxidation•stabilization are given in Table 2.

EXAMPLE 4-2

Oxidation•Stabilization Reaction by Atmospheric Pressure Plasma

Instead of the oxidation•stabilization reaction through heat treatment under oxidizing atmosphere in example 4-1, a temperature controllable chamber with a plasma module using an RF generator as a power source was created, the temperature in the chamber was uniformly maintained, and argon gas as plasma generating gas and oxygen gas as reactive gas was mixed and injected to generate monoatomic oxygen or superoxide ($O_2^-$), hydrogen peroxide ($H_2O_2$), and hydroxyl radical (.OH) at the time of plasma generation, promoting oxidation•stabilization reaction. The reaction conditions for plasma oxidation•stabilization are given in Table 2.

EXAMPLE 5

Carbon Fiber Preparation by Carbonization Reaction

Carbonization was performed by heat treatment of the PAN fiber oxidized•stabilized through Table 2. The carbonization was performed during the temperature rise of 5° C. per minute from 1200° C., and subsequently, natural cooling was performed by air cooling. In this instance, nitrogen gas was continuously injected into the chamber during the carbonization reaction to prevent other reaction (oxidation reaction) from occurring. The properties of the prepared carbon fiber are shown in Table 3.

In the case of the PAN fiber for textiles, the carbon fiber prepared from the precursor fiber subjected to stabilization reaction by atmospheric pressure plasma coupling thermal energy at 240° C. for 195 minutes has better properties than the precursor fiber oxidized•stabilized by thermal energy alone at 200~255° C. for 390 minutes. Furthermore, in the case of electron beam crosslinking, followed by thermal stabilization or oxidation•stabilization using thermal coupling plasma at 200~260° C. for 90 minutes and at 230° C. for 30 minutes, respectively, the carbon fiber with better properties was prepared at much lower temperature and shorter time. This result showed a similar effect on the case where the carbon fiber precursor fiber was used.

After electron beam crosslinking of the multi-walled carbon nanotube composite carbon fiber precursor PAN fiber, the carbon fiber prepared by oxidation•stabilization by thermal coupling plasma and carbonization has significantly reduced oxidation•stabilization reaction time from 230° C./120 min to 230° C./30 min and greatly increased tensile strength and elasticity of the prepared carbon fiber from 2.2 GPa and 195 GPa to 3.2 GPa and 245 GPa, respectively, when compared to the carbon fiber prepared after thermal stabilization of the carbon fiber precursor PAN fiber, showing the possibility of production of a high performance carbon fiber at a low cost.

Also, in the case of the multi-walled carbon nanotube composite PAN fiber, when subjected to oxidation•stabilization reaction by thermal energy or thermal coupling plasma after electron beam crosslinking, much lower temperature and reaction time savings as well as significant reductions in energy consumption are achieved, and most of all, the mechanical properties are greatly improved with the addition of carbon nanotube.

TABLE 2

| Electron beam cross-linking | Oxida-tion•sta-bilization | Oxidation•stabilization temperature/time | | | |
|---|---|---|---|---|---|
| | | PAN fiber 1 | PAN fiber 2 (MWCNT) | PAN fiber 3 | PAN fiber 4 (MWCNT) |
| 0 | Thermal energy | 200~255° C./390 min | | 230° C./120 min | |
| | Thermal coupling plasma | | 240° C./195 min | | 230° C./60 min |
| 1,000 kG | Thermal energy | 200~260° C./90 min | | 230° C./30 min | |
| | Thermal coupling plasma | | 230° C./30 min | | 230° C./30 min |

TABLE 3

| Precursor fiber | Oxidation•sta-bilization | Electron beam Cross-linking | Carbon fiber diameter | Tensile strength (GPa) | Elas-ticity (GPa) |
|---|---|---|---|---|---|
| PAN fiber 1 | Thermal energy | 0 | 6.2 | 1.69 | 140 |
| | | 1000 kGy | 6.2 | 1.80 | 143 |
| | Thermal coupling plasma | 0 | 6.1 | 1.77 | 146 |
| | | 1000 kGy | 6.1 | 1.92 | 149 |
| PAN fiber 2 (MWCNT) | Thermal energy | 0 | 6.1 | 2.0 | 205 |
| | | 1000 kGy | 6.2 | 2.5 | 215 |
| | Thermal coupling plasma | 0 | 6.1 | 2.1 | 207 |
| | | 1000 kGy | 6.1 | 2.6 | 242 |
| PAN fiber 3 | Thermal energy | 0 | 6.3 | 2.2 | 195 |
| | | 1000 kGy | 6.2 | 2.5 | 210 |
| | Thermal coupling plasma | 0 | 6.1 | 2.2 | 190 |
| | | 1000 kGy | 6.2 | 2.9 | 228 |

TABLE 3-continued

| Precursor fiber | Oxidation•stabilization | Electron beam Cross-linking | Carbon fiber diameter | Tensile strength (GPa) | Elasticity (GPa) |
|---|---|---|---|---|---|
| PAN fiber 4 (MWCNT) | Thermal energy | 0 | 6.1 | 2.7 | 210 |
|  |  | 1000 kGy | 6.0 | 2.9 | 225 |
|  | Thermal coupling plasma | 0 | 6.2 | 3.0 | 210 |
|  |  | 1000 kGy | 6.1 | 3.2 | 235 |

EXAMPLE 6

A spinning solution prepared by dissolving polyacrylonitrile fiber for carbon fiber precursors having My of 280,000 in a dimethylformamide (DMF) solution was dry jet wet spun using a 30% DMF aqueous solution as a coagulation bath to prepare a precursor fiber (PAN fiber 5). Also, a spinning solution containing 1 wt % of single-walled carbon nanotubes based on the weight of the polyacrylonitrile was prepared and spun in the same spinning condition to prepare a single-walled carbon nanotube composite polyacrylonitrile precursor fiber (PAN fiber 6).

EXAMPLE 6-1

Oxidation•Stabilization Reaction Under Oxidizing Atmosphere

For the precursor fiber of example 6 and fiber samples obtained by crosslinking it by electron beam irradiation of 1500 kGy, an oxidation•stabilization process was performed in a temperature controllable electric furnace under air atmosphere through heat treatment at 230° C. for 120 minutes and at 230° C. for 30 minutes, respectively. Also, for the precursor fiber of example 6 and the fiber samples obtained by crosslinking it by electron beam irradiation of 1500 kGy, instead of the oxidation•stabilization reaction through heat treatment under oxidizing atmosphere, a temperature controllable chamber with a plasma module using an RF generator as a power source was created, the temperature in the chamber was uniformly maintained, and argon gas as plasma generating gas and oxygen gas as reactive gas was mixed and injected to generate a plasma, promoting oxidation•stabilization reaction at 230° C. for 60 minutes and at 230° C. for 30 minutes, respectively.

EXAMPLE 6-2

Carbon Fiber Preparation by Carbonization Reaction

Carbonization was performed by heat treatment of the oxidized•stabilized PAN fiber carried out in example 6-1. The carbonization was performed during the temperature rise of 5 per minute from 1200, and subsequently, natural cooling was performed by air cooling. In this instance, nitrogen gas was continuously injected into the chamber during the carbonization reaction to prevent other reaction (oxidation reaction) from occurring. The properties of the prepared carbon fiber are shown in Table 4.

In the case of oxidation•stabilization by thermal energy alone, the precursor fiber radiated by an electron beam after heat treatment at 230° C. for 30 minutes showed better carbon fiber properties than the precursor fiber oxidized•stabilized at 230° C. for 120 minutes without electron beam crosslinking. Similarly, due to the carbon nanotube composite structure, the single-walled carbon nanotube composite PAN fiber precursor contributed to the preparation of superior carbon fibers to the precursor containing no carbon nanotube, and in the case of oxidation•stabilization by thermal energy or thermal coupling plasma energy after electron beam crosslinking, stabilization was completed at much lower temperature and reduced time, and as can be seen from Table 4, the carbon fiber with better properties was prepared than the case where electron beam crosslinking was not performed.

TABLE 4

| Precursor fiber | Oxidation•stabilization | Electron beam cross-linking | Carbon fiber diameter (μm) | Tensile strength (GPa) | Elasticity (GPa) |
|---|---|---|---|---|---|
| PAN fiber 5 | Thermal energy | 0 | 6.0 | 3.1 | 211 |
|  |  | 1500 kGy | 6.0 | 3.6 | 220 |
|  | Thermal coupling plasma | 0 | 6.1 | 3.2 | 220 |
|  |  | 1500 kGy | 6.0 | 3.7 | 235 |
| PAN fiber 6 (SWCNT) | Thermal energy | 0 | 6.1 | 4.1 | 240 |
|  |  | 1500 kGy | 6.1 | 4.5 | 245 |
|  | Thermal coupling plasma | 0 | 6.1 | 4.2 | 238 |
|  |  | 1500 kGy | 6.0 | 4.8 | 250 |

EXAMPLE 7

A spinning solution was prepared by dissolving polyacrylonitrile fiber for carbon fiber precursors having Mv of 280,000 in a dimethylformamide (DMF) solution containing 0.5 wt % of graphene oxide dispersed based on the weight of the polyacrylonitrile, and dry jet wet spun using a 20% DMF aqueous solution of room temperature as a coagulation bath to prepare a graphene composite polyacrylonitrile precursor fiber.

EXAMPLE 7-1

Oxidation•Stabilization Reaction Under Oxidizing Atmosphere

For the graphene composite precursor fiber of example 7 and fiber samples obtained by crosslinking it by electron beam irradiation of 1000 kGy, an oxidation•stabilization process was performed under air atmosphere through heat treatment in a temperature controllable electric furnace at 230° C. for 120 minutes and at 230° C. for 30 minutes, respectively.

EXAMPLE 7-2

Carbon Fiber Preparation by Carbonization Reaction

Carbonization was performed by heat treatment of the oxidized•stabilized graphene composite PAN fiber carried out in example 7-1. The carbonization was performed during the temperature rise of 5 per minute from 1200 under nitrogen gas atmosphere, and subsequently, natural cooling was performed by air cooling. The properties of the prepared carbon fiber were lower than the carbon nanotube composite carbon fiber, while the properties of the graphene composite carbon fiber crosslinked by electron beam irradiation showed better properties than the case where electron beam irradiation was not performed.

EXAMPLE 8

Carbonization Reaction by Microwave Assisted Plasma

For fibers prepared from the single-walled carbon nanotube composite PAN fiber 6 prepared in example 6-1 that have undergone oxidation•stabilization reaction by thermal energy coupling plasma after electron beam crosslinking of 1500 kGy, carbonization was performed using microwave assisted plasma (MAF) to prepare a carbon fiber.

Furthermore, as a result of evaluating the properties of the prepared carbon fiber, the tensile strength and elasticity was 4.6 GPa and 247 GPa which showed similar properties to the carbonization reaction by thermal energy.

As identified by the above examples, before performing an oxidation•stabilization process using a nanocarbon composite polyacrylonitrile fiber as a precursor according to the present disclosure, oxidation•stabilization by thermal energy or atmospheric pressure plasma after crosslinking by electron beam irradiation can prepare a carbon fiber with better properties and significantly reduce the thermal stabilization time and consequently energy consumption. Particularly, in performing the oxidation•stabilization process after electron beam irradiation, it can be seen that the plasma energy-introduced thermal stabilization process can significantly reduce the oxidation•stabilization processing time and improve the mechanical properties of a carbon fiber, compared to that of thermal energy alone.

Moreover, it can be seen that the technology of the present disclosure can be applied to both an acrylic fiber for textiles with a nanocarbon composite structure and an acrylic fiber including 95 wt % or more of carbon fiber precursors, and produce a high performance carbon fiber at a low cost.

DESCRIPTION OF REFERENCE NUMERALS a: Nanocarbon composite precursor fiber of carbon fiber
b: Crosslinking by electron beam irradiation
c: Oxidation stabilization by thermal energy in air or thermal energy coupling plasma processing
d: Thermal carbonization furnace
e: Carbonization and graphitization by microwave assisted plasma
f: Carbon fiber

What is claimed is:

1. A preparation method of a nanocarbon composite carbon fiber, comprising:
   a nanocarbon containing step for containing nanocarbon in a structure of a carbon fiber precursor fiber;
   a nanocarbon composite carbon fiber precursor fiber preparation step for forming a composite of the nanocarbon and the carbon fiber precursor fiber by electron beam irradiation to enable crosslinking for improved heat resistance of the carbon fiber precursor fiber containing the nanocarbon;
   an oxidation•stabilization step for oxidizing•stabilizing the nanocarbon composite carbon fiber precursor fiber; and
   a carbonization step for carbonizing the oxidized•stabilized nanocarbon composite carbon fiber precursor fiber,
   wherein the nanocarbon composite carbon fiber precursor fiber preparation step is performed in air within a temperature range of from a room temperature to 300° C. by electron beam irradiation with energy of 50 kGy~5000 kGy.

2. The preparation method of a nanocarbon composite carbon fiber according to claim 1, wherein the nanocarbon containing step comprises containing the nanocarbon in the structure of the carbon fiber precursor fiber by wet spinning or dry jet wet spinning of the nanocarbon and a carbon fiber precursor.

3. The preparation method of a nanocarbon composite carbon fiber according to claim 1, wherein the carbon fiber precursor fiber is polyacrylonitrile for textiles or an acrylic fiber including a carbon fiber precursor having 95 wt % or more of acrylonitrile (AN) monomers, and the nanocarbon is selected from the group consisting of carbon nanotube (CNT), carbon nano fiber (CNF), graphite nano fiber (GNF), graphene, graphene oxide, and fullerene.

4. The preparation method of a nanocarbon composite carbon fiber according to claim 1, wherein the oxidation•stabilization step is performed by thermal energy in air or by generating a plasma while mixing and injecting argon gas as plasma generating gas and oxygen gas as reactive gas into a reaction chamber under atmospheric pressure or vacuum.

5. The preparation method of a nanocarbon composite carbon fiber according to claim 4, wherein the oxidation•stabilization step is performed in a temperature range of 180~350° C. under oxidizing atmosphere in the presence of oxygen.

6. The preparation method of a nanocarbon composite carbon fiber according to claim 4, wherein the oxidation•stabilization step is performed for 30 minutes~250 minutes.

7. The preparation method of a nanocarbon composite carbon fiber according to claim 1, wherein the carbonization step comprises carbonizing the oxidized•stabilized nanocarbon composite carbon fiber precursor fiber by thermal energy or microwave assisted plasma.

8. The preparation method of a nanocarbon composite carbon fiber according to claim 1, after the carbonization step, further comprising:
   a graphitization step by thermal energy or microwave assisted plasma at higher temperature than a carbonization temperature.

* * * * *